United States Patent
Inam et al.

(10) Patent No.: US 10,582,415 B2
(45) Date of Patent: Mar. 3, 2020

(54) ASSOCIATING UNIT, A MOBILE TERMINAL, AND METHODS THEREIN FOR SETTING UP BEARERS, AND COMMUNICATING IN A CONGESTED COMMUNICATIONS NETWORK

(71) Applicant: Telefonaktiebolaget LM Ericsson (publ), Stockholm (SE)

(72) Inventors: Rafia Inam, Västerås (SE); Elena Fersman, Stockholm (SE); Jens Malmodin, Norrtälje (SE); Sébastien Pierrel, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 43 days.

(21) Appl. No.: 16/070,593

(22) PCT Filed: Feb. 17, 2016

(86) PCT No.: PCT/SE2016/050121
§ 371 (c)(1),
(2) Date: Jul. 17, 2018

(87) PCT Pub. No.: WO2017/142447
PCT Pub. Date: Aug. 24, 2017

(65) Prior Publication Data
US 2019/0007864 A1    Jan. 3, 2019

(51) Int. Cl.
*H04W 88/02* (2009.01)
*H04W 28/02* (2009.01)
(Continued)

(52) U.S. Cl.
CPC ....... *H04W 28/0289* (2013.01); *H04W 24/10* (2013.01); *H04W 28/02* (2013.01); *H04W 76/12* (2018.02); *H04W 88/02* (2013.01)

(58) Field of Classification Search
CPC ..... H04W 28/02; H04W 76/12; H04W 24/10; H04W 28/0289; H04W 88/02
See application file for complete search history.

(56) References Cited

U.S. PATENT DOCUMENTS

2011/0170408 A1* 7/2011 Furbeck ............. H04L 47/10
                                                   370/230
2014/0286268 A1* 9/2014 Liu ................... H04W 52/343
                                                   370/329
(Continued)

FOREIGN PATENT DOCUMENTS

WO    2013123467 A1    8/2013

*Primary Examiner* — Chi Ho A Lee
(74) *Attorney, Agent, or Firm* — Coats & Bennett, PLLC

(57) ABSTRACT

A method performed by an associating unit, for setting up bearers in a communications network being congested is provided. The associating unit serves a mobile terminal comprising an application related to communication over the communications network. The associating unit, a network node and the mobile terminal operate in the communications network. The associating unit receives (301) information from the network node. The information is about a current congestion level of the communications network. The associating unit further receives (302) a selected preference level for the application from the mobile terminal. When the communications network is congested, the associating unit sets up (303), a set of bearers with different levels of priority in the communications network, based on the current congestion level of the communications network. This is performed by associating a bearer with its priority level with the application based on the selected preference level of the application. The bearer is set up for the application in mobile terminal for communication over the communications network.

20 Claims, 10 Drawing Sheets

(51) Int. Cl.
    *H04W 76/12*     (2018.01)
    *H04W 24/10*     (2009.01)

(56) References Cited

U.S. PATENT DOCUMENTS

| | | | |
|---|---|---|---|
| 2014/0309864 A1* | 10/2014 | Ricci | A61B 5/0077 |
| | | | 701/36 |
| 2015/0003254 A1* | 1/2015 | Sasaki | H04W 28/08 |
| | | | 370/237 |
| 2015/0223107 A1 | 8/2015 | Zaus et al. | |
| 2015/0281999 A1 | 10/2015 | Zhu et al. | |
| 2016/0094427 A1* | 3/2016 | Talat | H04L 41/0213 |
| | | | 709/223 |
| 2016/0135076 A1* | 5/2016 | Grinshpun | H04W 28/0284 |
| | | | 370/235 |
| 2016/0295429 A1* | 10/2016 | Enqvist | H04W 4/18 |
| 2016/0330768 A1* | 11/2016 | Hu | H04W 74/006 |
| 2016/0345196 A1* | 11/2016 | Frydman | H04W 28/0289 |
| 2016/0353320 A1* | 12/2016 | Hongo | H04W 36/0077 |
| 2017/0006442 A1* | 1/2017 | Lee | H04W 48/12 |
| 2018/0098177 A1* | 4/2018 | Buyukkoc | H04W 4/00 |
| 2018/0206148 A1* | 7/2018 | Zhang | H04L 47/11 |

\* cited by examiner

| QCI | Bearer Type | Priority | Packet Delay | Packet Loss | Example |
|---|---|---|---|---|---|
| 1 | GBR | 2 | 100 ms | $10^{-2}$ | VoIP call |
| 2 | GBR | 4 | 150 ms | $10^{-3}$ | Video call |
| 3 | GBR | 3 | 50 ms | $10^{-3}$ | Online Gaming (Real Time) |
| 4 | GBR | 5 | 300 ms | $10^{-6}$ | Video streaming |
| 5 | Non-GBR | 1 | 100 ms | $10^{-6}$ | IMS Signaling |
| 6 | Non-GBR | 6 | 300 ms | $10^{-6}$ | Video, TCP based services e.g. email, chat, ftp etc |
| 7 | Non-GBR | 7 | 100 ms | $10^{-3}$ | Voice, Video, Interactive gaming |
| 8 | Non-GBR | 8 | 300 ms | $10^{-6}$ | Video, TCP based services e.g. email, chat, ftp etc |
| 9 | Non-GBR | 9 | | | |

Fig. 1

ASSOCIATING UNIT, A MOBILE TERMINAL, AND METHODS THEREIN FOR SETTING UP BEARERS, AND COMMUNICATING IN A CONGESTED COMMUNICATIONS NETWORK

TECHNICAL FIELD

Embodiments herein relate to an associating unit, a method therein, a computer program and a carrier comprising the computer program. In particular, they relate to setting up bearers in a congested communications network.

Further embodiments herein relate to a mobile terminal, a method therein, a computer program and a carrier comprising the computer program. In particular, they relate to communicating in the congested communications network.

BACKGROUND

Wireless devices or mobile terminals for communication are also known as e.g. User Equipments (UE), mobile terminals, wireless terminals and/or mobile stations. Mobile terminals are enabled to communicate wirelessly in a communication network such as a mobile network, sometimes also referred to as a wireless communications system, a cellular radio system or cellular networks. The communication may be performed e.g. between two mobile terminals, between a mobile terminal and a regular telephone and/or between a mobile terminal and a server, such as server providing video streaming service, via a Radio Access Network (RAN) and possibly one or more core networks, comprised within the communications network.

Mobile terminals may further be referred to as mobile telephones, cellular telephones, computers, or surf plates with wireless capability, just to mention some further examples. The mobile terminals in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. Two mobile terminals involved in D2D communication may also be referred to as a transmitter-receiver pair. In the context of this disclosure, the expression Downlink (DL) is used for the transmission path from the base station to a wireless device. The expression Uplink (UL) is used for the transmission path in the opposite direction i.e. from the wireless device to the base station.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

Today's mobile terminals are often so called smartphones in which several mobile applications, also referred to as apps, are installed, such as e-mail, twitter, Facebook, etc.

A mobile application is a computer program designed to run on mobile terminals such as smartphones and tablet computers etc. Most such mobile terminals are sold with several applications bundled as pre-installed software, such as a web browser, email client, calendar, mapping program, and an app for buying music or other media or more apps. A large number of applications are available to be downloaded from servers many of them free of charge, e.g. social applications such as Facebook, Twitter, Instagram, WhatsApp, and Viber etc.

Often mobile network congestion is observed during big events, such as concerts or football games, when thousands of mobile terminals in close geographical proximity simultaneously download and upload data such as status, photos, videos of the event, or group chat about the event etc. to their social webpages from their mobile terminal applications. This results in a mobile network congestion leading to decreased usability of the mobile applications. In extreme cases of network congestion, the perception is that it becomes no longer possible to use the mobile applications.

Thus, there is a need to improve the usability of mobile terminal in such situations.

SUMMARY

It is therefore an object of embodiments herein to improve a mobile terminal user experience in a congested communications network.

According to a first aspect of embodiments herein, the object is achieved by a method performed by an associating unit, for setting up bearers in a communications network being congested. The associating unit serves a mobile terminal, which mobile terminal comprises an application related to communication over the communications network. The associating unit, a network node and the mobile terminal operate in the communications network.

The associating unit receives information from the network node. The information is about a current congestion level of the communications network.

The associating unit further receives a selected preference level for the application from the mobile terminal.

When the communications network is congested, the associating unit sets up, a set of bearers with different levels of priority in the communications network, based on the current congestion level of the communications network. This is performed by associating a bearer with its priority level, out of the set of bearers, with the application based on the selected preference level of the application. The bearer in the set of bearers is set up for the application in mobile terminal for communication over the communications network.

According to a second aspect of embodiments herein, the object is achieved by a computer program comprising instructions, which when executed by at least one processor, cause the at least one processor to perform actions according to any of the actions above.

According to a third aspect of embodiments herein, the object is achieved by a carrier comprising the computer program. The carrier is one of an electronic signal, an optical signal, an electromagnetic signal, a magnetic signal, an electric signal, a radio signal, a microwave signal, or a computer-readable storage medium.

According to a forth aspect of embodiments herein, the object is achieved by a method performed by a mobile terminal for communicating in a communications network being congested. The mobile terminal is served by an associating unit. The mobile terminal comprises an application related to communication over the communications network. The associating unit and the mobile terminal operate in the communications network.

The mobile terminal selects a preference level for the application, and sends the selected preference level to the associating unit. A set of bearers with different levels of priority is set up in the communications network, when the communications network is congested, based on a current congestion level of the communications network. A bearer with its respective priority level out of the set of bearers, is associated to the application based on the selected preference level of the application. The bearer in the set of bearers is set up for the application in the mobile terminal for communication over the communications network.

According to a fifth aspect of embodiments herein, the object is achieved by a computer program comprising instructions, which when executed by at least one processor, cause the at least one processor to perform actions according to any of the actions above.

According to a sixth aspect of embodiments herein, the object is achieved by a carrier comprising the computer program. The carrier is one of an electronic signal, an optical signal, an electromagnetic signal, a magnetic signal, an electric signal, a radio signal, a microwave signal, or a computer-readable storage medium.

According to a seventh aspect of embodiments herein, the object is achieved by an associating unit for setting up bearers in a communications network being congested. The associating unit is operable to serve a mobile terminal. The mobile terminal is adapted to comprise an application related to communication over the communications network. The associating unit, a network node and the mobile terminal are operable in the communications network. The associating unit is configured to:

Receive from the network node, information about a current congestion level of the communications network, Receive from the mobile terminal, a selected preference level for the application, When the communications network is congested, set up in the communications network, a set of bearers with different levels of priority, based on the current congestion level of the communications network, by associating a bearer with its priority level, out of the set of bearers, with the application based on the selected preference level of the application, which bearer in the set of bearers is set up for the application in mobile terminal for communication over the communications network.

According to an eighth aspect of embodiments herein, the object is achieved by a mobile terminal for communicating in a communications network being congested. The mobile terminal is operable to be served by an associating unit. The mobile terminal is adapted to comprise an application related to communication over the communications network. The associating unit and the mobile terminal are operable in the communications network. The mobile terminal is configured to:

Select a preference level for the application, and send, to the associating unit, the selected preference level. A set of bearers with different levels of priority of the bearers is set up in the communications network, when the communications network is congested, based on a current congestion level of the communications network. A bearer with its priority level out of the set of bearers, is associated to the application based on the selected preference level of the application, which bearer in the set of bearers is set up for the application in the mobile terminal for communication over the communications network.

An advantage of embodiments herein is that selected preferences of applications operating on mobile terminals enable use of the applications even when a communications network is congested. This makes it possible for upload and download of data using selected prioritized applications, depending on the network congestion levels and user preferences. The advantage of this is the focus on the user preferences e.g. for different network congestion levels.

This in turn results in that the mobile terminal user experience is improved in a congested communications network.

BRIEF DESCRIPTION OF THE DRAWINGS

Examples of embodiments herein are described in more detail with reference to attached drawings in which:

FIG. 1 is a schematic block diagram illustrating bearers of a communications network.

DETAILED DESCRIPTION

Mobile network congestion may be observed during big events when a large number of mobile terminals simultaneously download and upload data. It may further happen that a user wants to use a minor functionality of a certain service, such as Facebook status update, while the applications on the mobile terminal start synchronizing their data. This means that Facebook may update the whole news feed at the same time as email are downloaded, thus congesting the network even more and preventing the user from accessing the intended operation.

As part of developing embodiments herein a problem was first identified and will be discussed below:

Currently, bearers are used in mobile networks to give priorities to different types of data traffic. QoS Class Identifier (QCI) is a mechanism used in 3GPP LTE networks to ensure bearer traffic is allocated appropriate Quality of Service (QoS). Different bearer traffic requires different QoS and therefore different QCI values, with 9 different QCI values currently specified. Therefore the multiple QCI classes are supported with different characteristics, like Guaranteed Bit Rate (GBR), latency, packet loss, as exemplified in FIG. 1.

The current mapping of bearers to different types of traffic is described below. Each bearer has a specific static priority.

Commonly used bearers in IP Multimedia Subsystems (IMS) Access Point Name (APN) are:
IMS signalling bearer, Non-Guarantied Bit Rate default, QCI=5 for SIP using SDP,
Voice Call bearer, Guarantied Bit Rate (GBR), QCI=1, for Voice using RTP
Video Call bearer, GBR, QCI=2, for Video using RTP, and Commonly used bearer in Internet APN is:
Internet bearer (Default) QCI=6 or 8 or 9 (default it is 9), for HTTP, ftp, chat, e-mail etc.

While traffic prioritization techniques exist in 4G networks, the priority levels are limited to fixed data types such as Voice over LTE (VoLTE), and there is no possibility to differentiate on traffic coming from different applications and even on features within one application, e.g. services using TCP protocol like email, chat, videos, etc. use the same level of priority. In general, currently, there is no way of specifying priorities of data traffic per application and per set of functionalities within an application. This granularity is however required to efficiently filter prioritized traffic in case of network congestions.

According to embodiments herein, an example of such differentiation would be to give Facebook notifications a higher priority, while updating the news feed a lower priority. Another example is a mail client where updating of inbox folder could have higher priority than sent folder.

Embodiment herein relate to Optimal Real-Time Service Configuration for a Mobile Terminal in Congested Mobile Networks, also referred to as Public Data Parking.

Figure 2A:
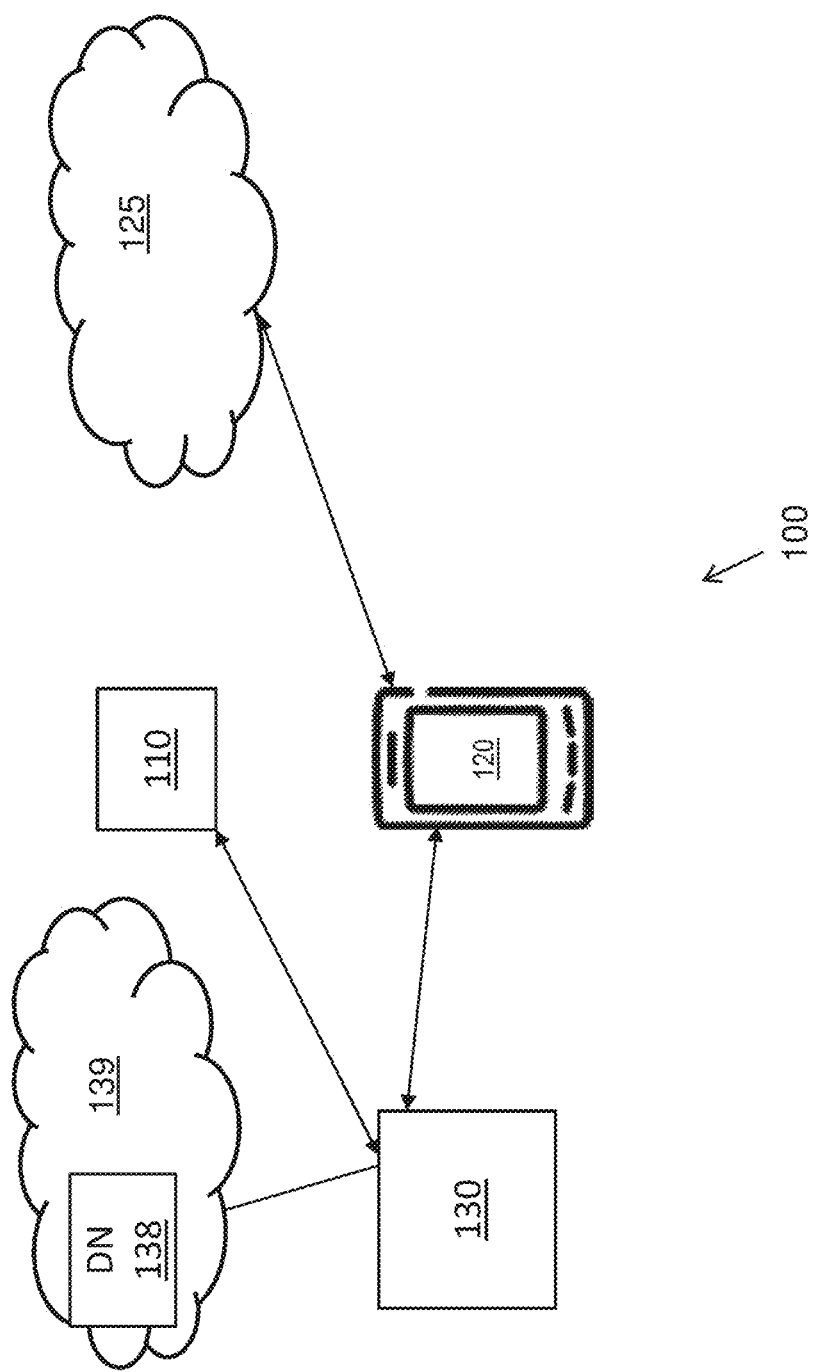
FIG. 2a is a schematic block diagram illustrating embodiments of a communications network.
Figure 2B:
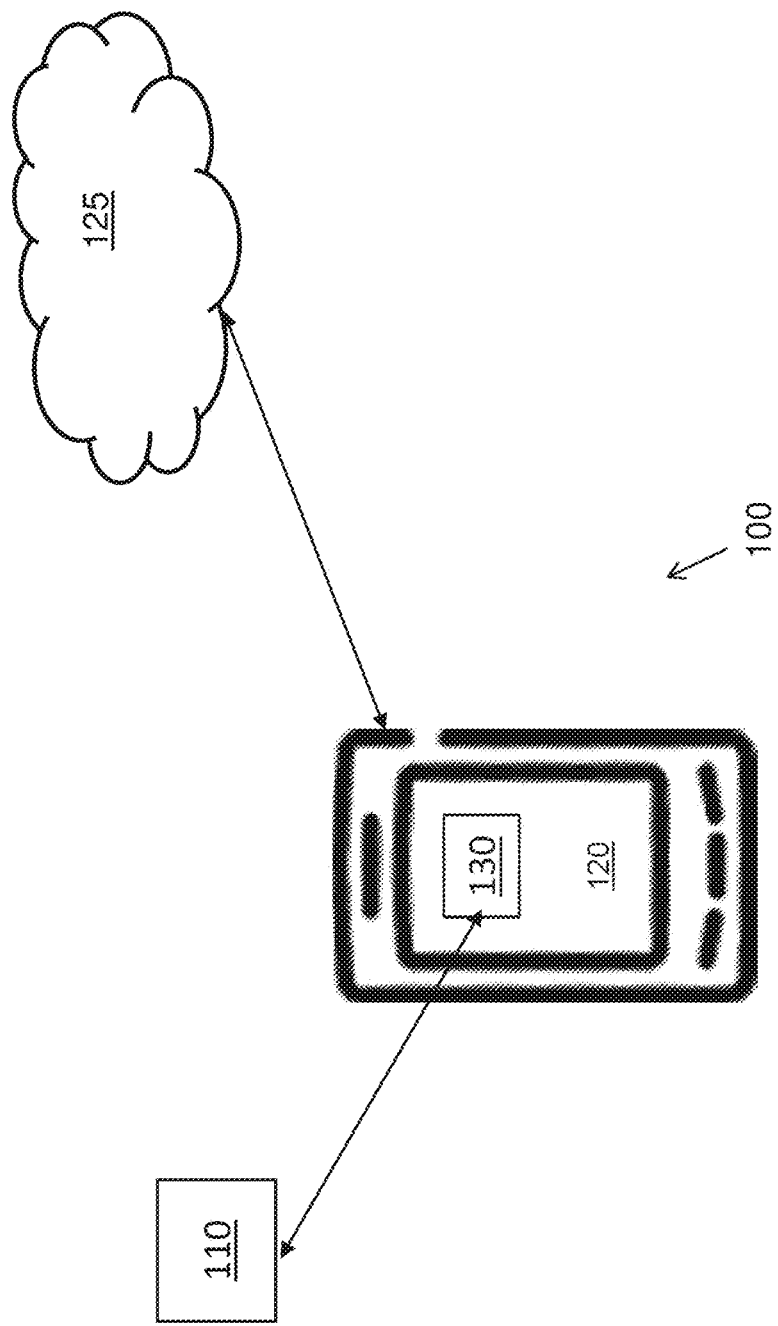
FIG. 2b is a schematic block diagram illustrating embodiments of a communications network.

FIGS. 2a and 2b depict an example of a communications network 100 in which embodiments herein may be implemented. The communications network 100 may comprise any one or more out of: LTE, GSM, GSM EDGE Radio Access Network (GERAN), Wi Fi, Wireless Local Area network (WLAN), WiMax, Code Divisional Multiple Access (CDMA) 2000, LTE-NX, Massive MIMO systems etc. EDGE is the abbreviation for Enhanced Data Rates for GSM Evolution, and NX LTE means next-generation 5G radio access technology.

A plurality of network nodes operates in the wireless communications network 100 whereof one, a network node 110 is depicted in FIGS. 2a and 2b. The network node 110 provides information to an associating unit 130 operating in the communications network 100. This will be described below.

One or more mobile terminals are operable in the communications network 100, whereof one a mobile terminal 120 is shown in FIGS. 2a and 2b.

The mobile terminal comprises one or more applications related to communication via the communications network 100 e.g. to the Internet 125. Such applications may e.g. be e-mail, twitter, Facebook, web browser, email client, calendar, mapping program, and an app for buying music or other media. In a first scenario the mobile terminal 120 comprises an application. The first scenario is the general scenario. According to a second scenario, the mobile terminal 120 comprises an application with multiple features also referred to as a set of functionalities within an application. E.g. the application Facebook comprises the features notifications, uploading photo or video, and updating news feed. Another example is a mail client application comprising the features of updating of inbox folder and updating sent folder. According to a third scenario the mobile terminal 120 comprises multiple applications. However, the mobile terminal 120 may also comprise multiple applications with respective multiple features.

The term mobile terminal when used herein may e.g. refer to a wireless device, a mobile wireless terminal or a wireless terminal, a mobile phone, a target device, a computer such as e.g. a laptop, a Personal Digital Assistants (PDAs) or an iPad, a tablet computer, sometimes referred to as a surf plate, with wireless capability, a smart phone, Laptop Embedded Equipment (LEE), Laptop Mounted Equipment (LME), Universal Serial Bus (USB) dongles or any other radio network units capable to communicate over a radio link in a wireless communications network.

An associating unit 130 operates in the communications network 100 and serves the UE 120. In some embodiments, the associating unit 130 may be comprised in a network node in the communications network 100 e.g. referred to as a mapping server. This is shown in FIG. 2a. In alternative embodiments the associating unit 130 is comprised in the mobile terminal e.g. referred to as a mobile app broker, which is shown in FIG. 2b.

The function of the associating unit 130 is to associate also referred to as map, an application or application feature set to bearers based on the user choices, e.g. a high priority application feature set will be mapped to a bearer with guaranteed higher bit rate QCI class and to stop low-priority requests from the mobile applications. The associating unit 130 may hold information on which traffic that will go on which bearer based on preference levels. The associating unit 130 is also responsible to create and manage the bearers in the network. This will be explained more below.

A method for setting up bearers in a communications network 100 being congested is performed by the associating unit 130. As an alternative, a Distributed Node (DN), such as the network node 138, and functionality, e.g. comprised in a cloud 139, as shown in FIG. 2a, may be used for performing the method.

The bearer used for embodiments herein may be the bearers as described above in relation to FIG. 1.

Exemplary embodiments herein are used to better utilize the communications network 100, by assigning priorities to different applications, and to different features of an application. Then sending data from high priority application/feature based on the priority level. Bearers are set up in the network for prioritized data streams.

Embodiments herein let the mobile terminal user continue using the most prioritized application set of features in the applications on the mobile terminal 120 even when the communications network 100 is congested. The applications and/or the set of features may be increased and/or decreased depending on the decrease and/or increase of the congestion level of the communications network 100 and user preferences. The embodiments herein may be used to drop low-priority requests. The decision whether to drop or pass through the requests is taken by the associating unit 130 such as e.g. the mapping server in the communications network 100 or the associating unit 130, such as e.g. the mobile app broker, in the mobile terminal 120, depending on the availability of bearers in the communications network 100.

Embodiments herein further discus a mechanism that allows application developers to define different priority levels for features within the application, which is later used in prioritizing traffic in case of congested mobile networks, according to a user's preferences.

Figure 3:
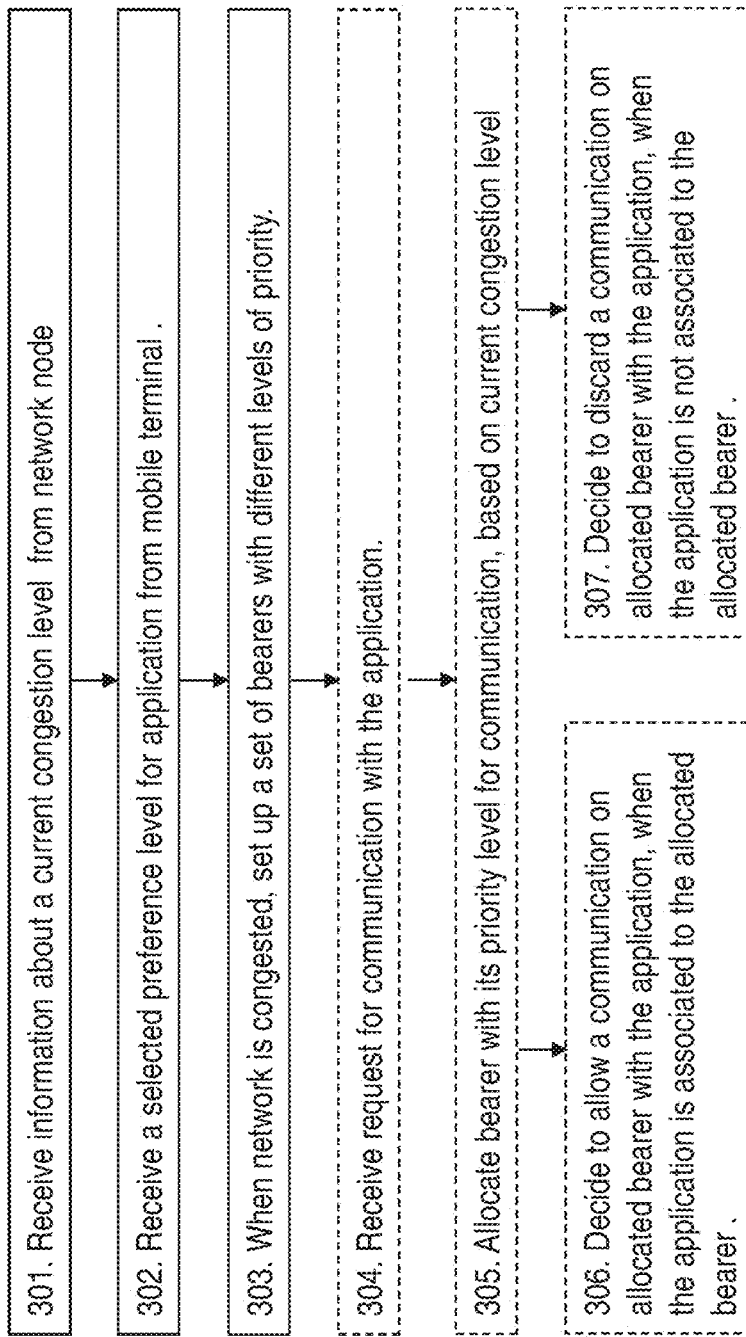
FIG. 3 is a flowchart depicting embodiments of a method in an associating unit.

Example embodiments of a method performed by an associating unit 130, for setting up bearers in a communications network 100 being congested will now be described with reference to a flowchart depicted in FIG. 3. As mentioned above the associating unit 130 serves the mobile terminal 120. The mobile terminal 120 comprises an application related to communication over the communications network 100. The application may comprise multiple applications and/or multiple features. The associating unit 130, the network node 110 and the mobile terminal 120 operate in the communications network 100. The associating unit 130 may e.g. be comprised in the mobile terminal 120 or a network node operating in the communications network 100.

In the examples herein the communications network 100 is to some degree congested.

The method comprises the following actions, which actions may be taken in any suitable order. Actions that are optional are presented in dashed boxes in FIG. 3.

Action 301

The associating unit 130 receives information from the network node 110. The information is about a current congestion level of the communications network 100. This is to be able to handle any congestion in the network when it appears. The congestion level is information about the traffic load in the communications network 100 and may e.g. comprise the percent traffic load of the load capacity, e.g. information that the congestion level is 80%. The information may e.g. be received from a network node that uses some network management monitoring functionality to collect statistics about the load of the infrastructure, e.g. how much a particular resource like router is used.

Action 302

Figure 5:
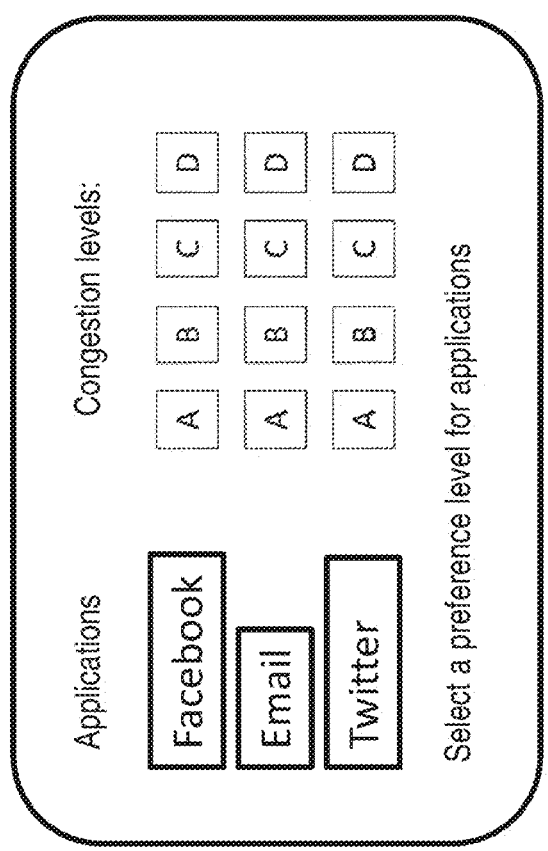
FIG. 5 is a schematic block diagram illustrating a sample user interface.

The associating unit 130 may request the mobile terminal 120 to select a preference level for each respective application, multiple applications and/or multiple features of the application or applications depending on congestion levels in the communications network 100 and the priorities, also referred to as preference levels e.g. in FIG. 5, of the application/features assigned by the user. How this is performed will be described in Action 401 below. The selected preference level for the respective applications and/or features of applications are then received by the associating unit 130. Consider the following example: The mobile terminal 120 selects a high preference level for the application feature "insert status" in the Facebook application and a lower preference level for updating the whole news feed of Facebook. Further the mobile terminal 120 selects a high preference level for the application feature "update inbox" in the email application" and a lower preference level for "update sent items" in the email application. These levels may e.g. be input by the user of the mobile terminal 120 or taken from default settings. A request for this is sent to the associating unit 130.

According to the first scenario, the associating unit 130 receives from the mobile terminal 120, a selected preference level for the application. E.g. the mobile terminal 120 selects a high preference level for the Facebook application.

According to the second scenario, the application comprises multiple features, wherein this action may comprise, receiving from the mobile terminal 120, a selected preference level for each respective application feature of the multiple features in the application. E.g. the mobile terminal 120 selects a high preference level for the application feature "insert status" in the Facebook application and a lower preference level for updating the whole news feed of Facebook.

According to the third scenario the mobile terminal 120 comprises multiple applications, wherein this action may comprise, receiving from the mobile terminal 120, a selected preference level for each respective application of the multiple applications. Here the mobile terminal 120 may select a high preference level for the Facebook application and a lower preference level for the email application. Or as a further alternative, the mobile terminal 120 e.g. selects a high preference level for the application feature "insert status" in the Facebook application and a lower preference level for updating the whole news feed of Facebook. Further the mobile terminal 120 selects a high preference level for the application feature "update inbox" in the email application" and a lower preference level for "update sent items" in the email application.

Action 303

When the communications network 100 is congested according to the received information, the associating unit 130 sets up a set of bearers with different levels of priority in the communications network 100. This is based on the current congestion level of the communications network 100. This may mean that the congestion level is above a threshold such as that traffic load is more than 60% to be deemed congested.

The bearers in the set of bearers have different levels of priority which are taken into consideration when associating the bearer with the application the application, the specific feature out of the multiple features of the application, and the specific application out of the multiple applications.

Consider the following example: The set of bearers comprises two bearers, B1 and B2. B1 has priority P1 and B2 has Priority P2 where P1 is higher than P2.

The bearers may be set up ad hoc, meaning that the bearers are created when needed, i.e. when network is congested.

According to the first scenario, the associating unit 130 sets up the set of bearers that have different levels of priority by associating a bearer with its priority level, out of the set of bearers, with the application based on the selected preference level of the application.

The classification of traffic may be based on identifying traffic by using e.g. one or more out of the following parameters: IP protocol, source/destination address and/or source/destination ports, and preference levels of the traffic. The mobile terminal 120 informs the associating unit 130 about the preference levels of traffic generated by the application, the different applications or the multiple features of the application. Mobile terminals supporting bearers use this classification to identify traffic connections and route them through specific bearers. According to embodiments herein, applications classify their traffic based on the preference level.

When establishing a new network traffic, the application may inform the mobile terminal 120 that this connection belongs to a traffic of a certain application or feature known to the system, e.g. Facebook application or email application or the application feature like "insert status" in the Facebook application, through a networking Application Programming Interface (API), e.g. socket API. The mobile terminal 120 sends this traffic information with the preference level of the traffic from the application feature to the associating unit 130. The associating unit 130 binds this traffic to the appropriate bearer according to the preference level. An example of binding is explained in the following algorithm by actions 4 to 7.

```
1. For all applications and application-features in the mobile terminal
120, the associating unit 130
    2.  Get traffic identity from the mobile terminal 120
    3.  Get preference level from the mobile terminal 120
    4.  If (preference level = highest) then
    5.      Map traffic -> highest priority bearer
    6.  Else if (preference level = medium) then
    7.      Map traffic -> medium priority bearer
    8. End loop
```

This algorithm may be used for all the three scenarios to map traffic with a certain preference level to a specific bearer.

In the example B1 with known priority P1 is associated with the Facebook application with the selected high preference level.

According to the second scenario, the application comprises multiple features, wherein the associating may comprise associating each bearer in the set of bearers, e.g. with its respective priority level to one or more of the respective application features based on its respective selected preference level. In the example B1 with known priority P1 is associated with the application feature "insert status" in the Facebook application with the selected high preference level, and B2 with the lower priority P2 is associated with the application feature updating the whole news feed of Facebook with the selected lower preference level.

According to the third scenario the mobile terminal 120 comprises multiple applications wherein the associating may comprise associating each bearer in the set of bearers e.g. with its respective priority level to one or more of the respective applications of the multiple applications based the selected preference level of respective application of the multiple applications. In the example, B1 with known priority P1 is associated with the Facebook application with selected high preference level, and B2 with the lower priority P2 is associated with e-mail application with selected lower preference level.

According to the first scenario, the bearer in the set of bearers is set up for the application in mobile terminal 120 for communication over the communications network 100. According to the second scenario, the bearers in the set of bearers are set up for the multiple features of the application in the mobile terminal 120 for communication over the communications network 100. According to the third scenario the bearers in the set of bearers are set up for the multiple applications in the mobile terminal 120 for communication over the communications network 100.

Action 304

Here e.g. the mobile terminal 120 and its user are located at concert and wishes to update its status in a Facebook application operating in the mobile terminal 120. A request for this is sent to the associating unit 130. Thus, in some embodiments, the associating unit 130 receives from the mobile terminal 120 or a network node operating in the communications network 100, a request for communication with, such as e.g. communication by means of, one or more out of: the application, the specific feature out of the multiple features of the application, and the specific application out of the multiple applications.

Action 305

The bearer creation above is a separate process which may be done at any time. To be efficient, the bearers may be created when a preference requiring a new set of priority is required.

When the mobile terminal 120 makes a request to communicate, then if bearers exists the applications are assigned to bearers depending upon the preference level of application set in the mobile terminal 120 by the user, and if the bearer is not there then the traffic may be bound to a lower priority, e.g. a default, bearer.

Thus the associating unit 130 allocates to the mobile terminal 120 a bearer with its priority level out of the set of bearers for a communication, based on the current congestion level of the communications network 100. Note that one mobile terminal is not restricted to be allocated to only one bearer. The wording "a bearer" here means "one or more bearers". This is since one mobile terminal such as the mobile terminal 120 may be allocated to multiple bearers as well. In this case, different applications running on the same mobile terminal may be allocated to different bearers depending on the priority of application. For example, Application A has highest priority allocated to highest priority bearer, while Application B of the same mobile terminal 120 has medium priority and is allocated to another medium priority bearer. The same will be held for multiple features of an application, high priority feature allocated to one bearer while lower priority feature of the same application is allocated to another bearer.

Action 306

According to embodiments herein, the associating unit 130 may decide whether or not to allow the requested communication. In some other embodiments herein, the mobile terminal may decide whether or not to allow the requested communication. This will be explained more in detail below.

Thus the associating unit 130 may decide to allow a communication on the allocated bearer with one or more out of:

The application according to the first scenario when the application is associated to the allocated bearer.

A specific feature out of the multiple features of the application according to the second scenario, when the specific feature is associated to the allocated bearer.

A specific application out of the multiple applications according to the third scenario, when specific application is associated to the allocated bearer.

The application being associated to a bearer means that the traffic of that application will flow on that allocated bearer.

Action 307

All applications allocated to low preference level and low priority bearer may be discarded in case of high congestion level of the network. So if an application or feature of application is not allocated to a bearer, then it may be discarded in a congested communications network situation.

Thus the associating unit 130 may decide to discard a communication on the allocated bearer with one or more out of:

The application according to the first scenario when the application is not associated to the allocated bearer.

A specific feature out of the multiple features of the application according to the second scenario, when the specific feature is not associated to the allocated bearer.

A specific application out of the multiple applications according to the third scenario, when specific application is not associated to the allocated bearer.

Now the method will be described from the mobile terminal 120 perspective. Please consider the examples described above.

Figure 4:
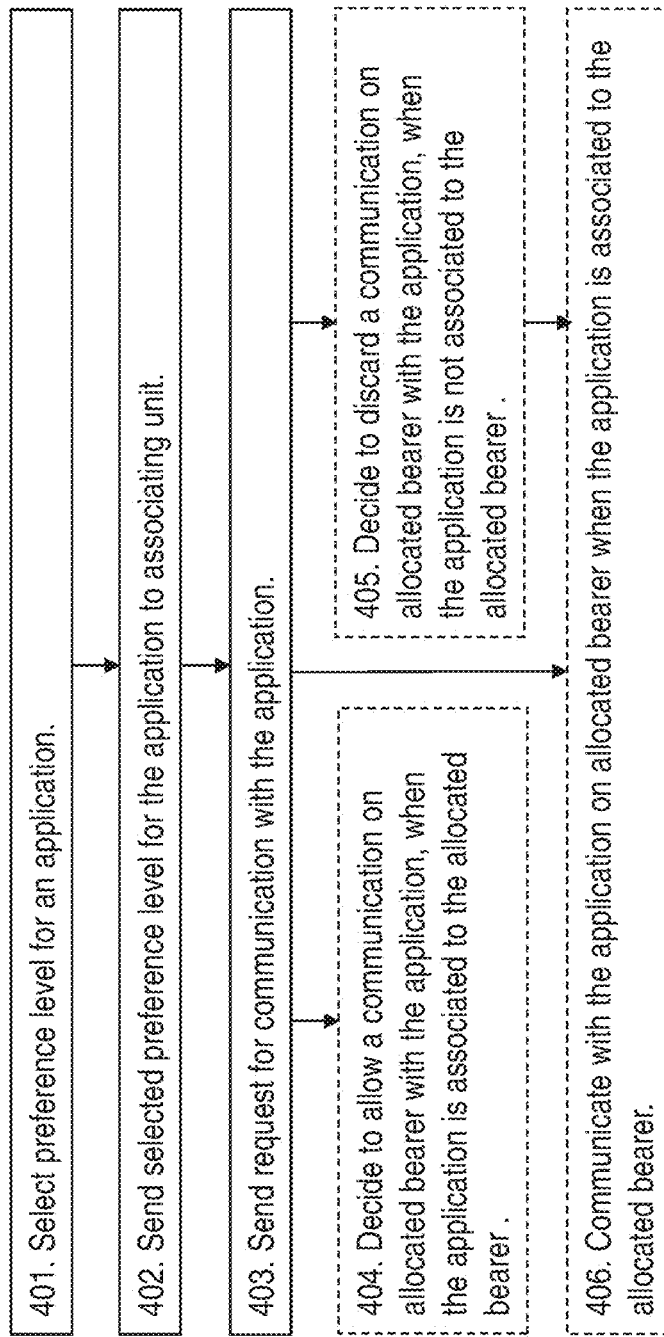
FIG. 4 is a flowchart depicting embodiments of a method in a mobile terminal.

Example embodiments of a method performed by a mobile terminal 120, for communicating in a communications network 100 being congested, will now be described with reference to a flowchart depicted in FIG. 4. As mentioned above, the mobile terminal 120 is served by the associating unit 130. The mobile terminal 120 comprises an application related to communication over the communications network 100. The application may comprise multiple applications and/or multiple features. The associating unit 130 and the mobile terminal 120 operate in the communications network 100. The associating unit 130 may e.g. be comprised in the mobile terminal 120 or a network node operating in the communications network 100. The associating unit 130 may be comprised in the mobile terminal 120.

In the examples herein the communications network 100 is to some degree congested.

The method comprises the following actions, which actions may be taken in any suitable order. Actions that are optional are presented in dashed boxes in FIG. 4.

Action 401

The applications may support multiple functionality levels based on network congestions, have default settings to work in normal situations, and support user choices for congestion levels.

The mobile terminal 120 gets notified about the network situation, i.e. congestion levels and a respective decrease in the functionality of the application depending on less resources for data traffic. This may be performed by a node that uses some network management monitoring functionality to collect statistics about the load of the infrastructure, e.g. how much a particular resource like a router is used. The mobile terminal 120, that may mean the user of the mobile terminal 120, then chooses preference level, i.e. priority levels, within and between applications.

Thus the mobile terminal 120 selects a preference level for each respective application, multiple applications and/or multiple features of the application or applications depending on congestion levels in the communications network 100. The preference level may also be referred to as a priority order related to different levels of congestion.

The preference level may be selected and registered for example but not limited to four levels, which is just one example out of many possible combinations, options and examples:

Congestion level A, the communications network load is 80%,

Congestion level B, the communications network load is 60%,

Congestion level C, the communications network load is 40%,

Congestion level D, the communications network load is 20%.

For example consider a Facebook application with two features.

For level A the mobile terminal 120 selects a high priority, i.e. a higher a preference level for the feature Facebook notification while the mobile terminal 120 selects no priority for the feature Facebook upgrade of newsfeeds.

For level B the mobile terminal 120 selects a higher priority for the feature Facebook notification; while the mobile terminal 120 selects the lowest priority for the feature Facebook upgrade of newsfeeds.

For level C and D the mobile terminal 120 selects the same priority for the feature Facebook notification and the feature Facebook upgrade of newsfeeds, i.e. all the application features will be available.

Similarly for an example application email client, for level A i.e. in a congested network situation only the application feature of inbox folder gets updated. In the case of or 20% network load all the application features will be available. This priority mapping is exemplified in FIG. 5. It will be entered in the mobile terminal 120, e.g. by the user, the preference levels for, within and between applications for the congested communications network 100. These settings may be saved in the terminal 120 for future use, if desired. A preference level corresponds to the maximum congestion level on which this feature is allowed to communicate.

The selected preference level for the respective applications and/or features of applications are then sent to the associating unit 130.

Action 402

According to the first scenario, the mobile terminal 120 sends the selected preference level for the application to the associating unit 130. According to the second scenario the application comprises multiple features, wherein this action may comprise, sending to the associating unit 130, a selected preference level for each respective application feature of the multiple features in the application. According to the third scenario the mobile terminal 120 comprises multiple applications, wherein this action may comprise, sending to the associating unit 130, a selected preference level for each respective application of the multiple applications.

A set of bearers with different levels of priority of the bearers is set up in the communications network 100 when the communications network 100 is congested, based on a current congestion level of the communications network 100.

According to the first scenario, a bearer with its priority level out of the set of bearers, is associated to the application based on the selected preference level of the application. As mentioned, the bearers in the set of bearers have different levels of priority. According to the second scenario each bearer with its respective priority level out of the set of bearers is associated to one or more of the respective application features based on its respective selected preference level. According to the third scenario each bearer with its respective priority level out of the set of bearers is associated to one or more of the respective applications of the multiple applications based the selected preference level of respective application of the multiple applications. This is explained and exemplified more in the text above.

The information about the set up bearer associated to one or more out of: the application, the specific feature out of the multiple features of the application, and the specific application out of the multiple applications may in some embodiments be sent from the associating unit 130 to the mobile terminal 120. This will be explained more below.

According to the first scenario, the bearer in the set of bearers is set up for the application in the mobile terminal 120 for communication over the communications network 100. According to the second scenario the bearers in the set of bearers are set up for the multiple features of the application in the mobile terminal 120 for communication over the communications network 100. According to the third scenario the bearers in the set of bearers are set up for the multiple applications in the mobile terminal 120 for communication over the communications network 100.

Action 403

The mobile terminal 120 may send to the associating unit 130 or a deciding unit 600 in the mobile terminal 120, a request for communication with, e.g. communicating by means of, one or more out of: the application, the specific feature out of the multiple features of the application, and the specific application out of the multiple applications.

Action 404

In some embodiments which will be described more in detail below, the mobile terminal 120 may decide to allow a communication on the allocated bearer with one or more out of:

The application when the application is associated to the allocated bearer, a specific feature out of the multiple features of the application when the specific feature is associated to the allocated bearer, and a specific application out of the multiple applications when specific application is associated to the allocated bearer.

This is performed in a similar way as described under Action 306.

Action 405

In some embodiments which will be described more in detail below, the mobile terminal 120 may decide to discard a communication on the allocated bearer with one or more out of:

The application when the application is not associated to the allocated bearer, a specific feature out of the multiple features of the application when the specific feature is not associated to the allocated bearer, and a specific application out of the multiple applications when specific application is not associated to the allocated bearer.

This is performed in a similar way as described under Action 307.

Action 406

According to the first scenario the mobile terminal 120 communicates with the application, i.e. by means of the application, on an allocated bearer out of the set of bearers, when the application is associated to the allocated bearer.

According to the second scenario the mobile terminal 120 communicates with a specific feature out of the multiple features of the application, when the specific feature is associated to the allocated bearer.

According to the third scenario the mobile terminal 120 communicates with a specific application out of the multiple applications in the mobile terminal 120, when the specific application is associated to the allocated bearer.

Again, please note that the mobile terminal 120 is capable of communicating with the application or feature that may be allocated to one or more bearers.

The methods described above will now be described more in detail for two alternative embodiments depending on bearer support in the communications network 100. The description below may refer to any embodiment above.

In some first embodiments the bearers are supported by the communications network 100. The way that the bearers are supported by the communications network 100 may be described as the following: Bearers are end-to-end communication channels between the mobile terminals and network nodes, e.g. Policy and Charging Rules Function (PCRF) in LTE. PCRF is a software node designated in real-time to determine policy rules in a communications network. For a network to support bearers, it must contain this endpoint node. This is prior art and a required by LTE standards. In these embodiments, the associating unit 130 is comprised in a network node operating in the communications network 100. This is e.g. possible in 3GPP $5^{th}$ generation also referred to as 3GPP 5G.

The first embodiments deal with the situation where flexible network bearers may be established in the communications network 100. Each of the bearers in the set of bearers is associated with a unique priority level as described above. The higher preference level functionality, such as of the application or the application features, is mapped to a higher level bearer as described above. E.g. Facebook notification is mapped to the higher higher-level bearer. Based on congestion level, the network such as the network node 110 or the associating unit 130 may decide to drop traffic on the bearers associated to the lowest priority level. When the congestion situation improves, the lowest priority bearers are activated.

The associating unit 130 is introduced into the system, which also may be referred to as a mapping server. Its functionality is e.g. to map application features categories, such as the applications or the application features, to congestion levels and communicate to both the communications network 100 and to the mobile terminal 120 e.g. to the application upon a change in the network congestion.

Figure 6:
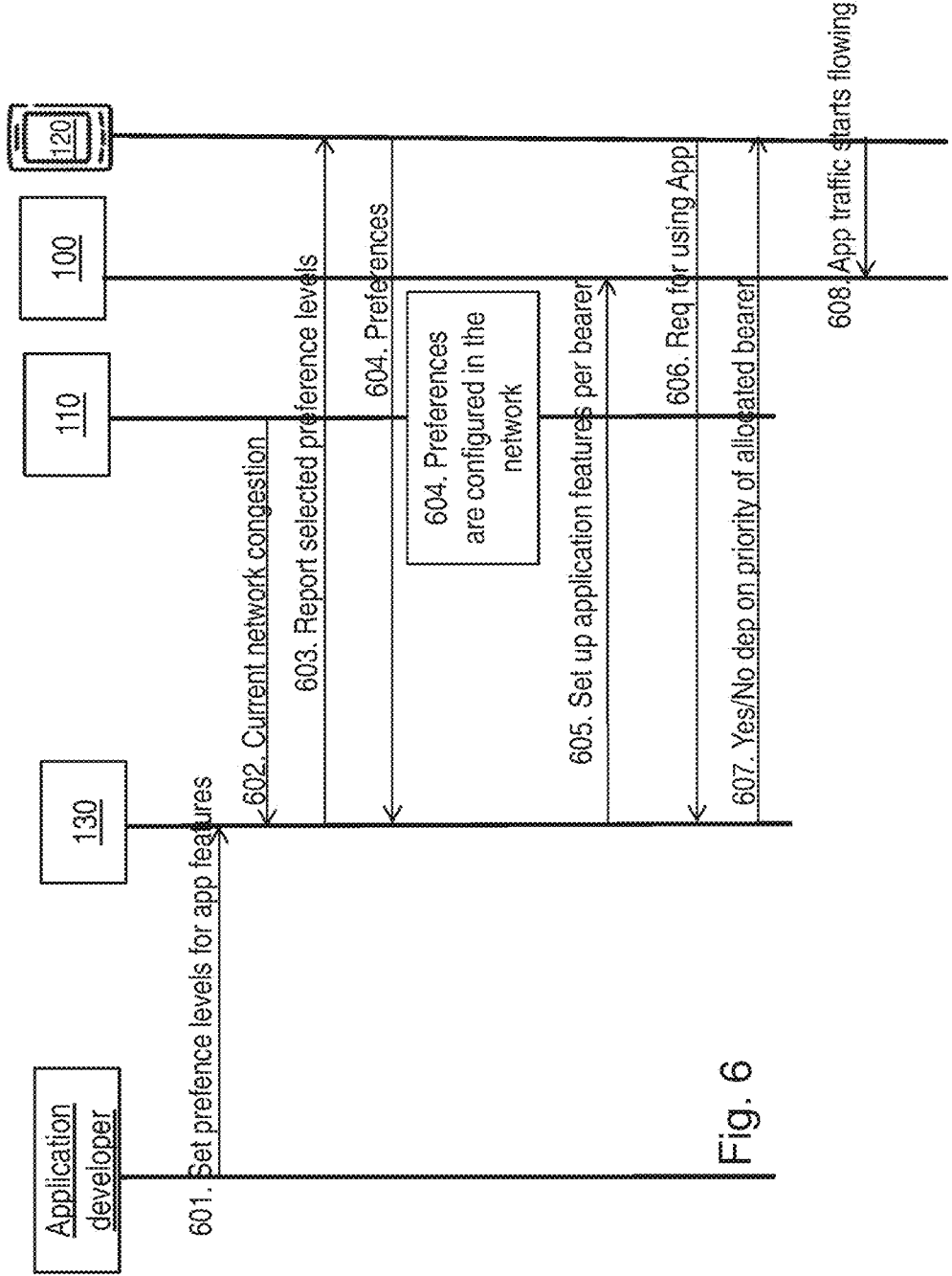
FIG. 6 is a sequence diagram depicting embodiments of a method in a communications network.

FIG. 6 is a sequence diagram that illustrates mapping of mobile application features to priority levels when network bearers are supported according to the first embodiments.

Action 601.

A mobile application developer or the user of the mobile terminal 120 establishes different priority levels for features within the application on the mobile terminal 120, e.g. Facebook status update is assigned a higher priority than Facebook news feed update. The established priority levels for the features within the application are sent to the associating unit 130 such as the mapping server. A message over Rx interface may be used to send this information from the mobile terminal 120 to the associating unit 130. The Rx interface is a 3GPP interface that runs between an Application Function and a PCRF.

If 130 is within the 120 (FIG. 2b) then it is set directly on 130.

The mobile application developer may develop the category in the settings of the mobile terminal 120 in order to assign preference levels to applications. The mobile application developer may then set some default preferences to applications and/or features of an application. The mobile terminal 120 may use the default settings or default settings may be changed by the user of the mobile terminal 120. The setting may be saved for future use or values may be entered each time if there is no wish to save the settings.

Action 602.

A Mobile network node such as the network node 110 in the communications network 100, reports the current congestion level to associating unit 130 such as the mapping server.

Action 603.

The associating unit 130 such as the mapping server in response asks user of the mobile terminal 120 in a message sent to the mobile terminal 120, to provide preferences, e.g. priority assignments to different mobile applications or set of features within an application. A user interface is exemplified in FIG. 5, where different priorities may be chosen in the mobile terminal 120 e.g. by the user, for application features depending upon the congestion level of the communications network 100.

Action 604.

The preferences are sent to the associating unit 130 such as the mapping server e.g. by using the Rx interface. This may be automatically sent to the associating unit 130 when the user has entered preferences in the interface.

Action 605.

The associating unit 130 such as the mapping server maps the application feature set to the created bearers based on the user choices; high priority application feature set will be mapped to a guaranteed higher bit rate QCI class.

Action 606.

In case an application intends to use more than the current priority settings of the application feature set, where the mobile terminal user choice may overrule the developer's choice, its request may be allowed or discarded by the network, e.g. by the associating unit 130 such as the mapping server or a network node such as the network node 110 in the communications network 100, depending upon the current congestion level of the communications network 100.

In some second embodiments the bearers are not supported by the communications network 100. This is the case e.g. in 3GPP $2^{nd}$, $3^{rd}$ and $4^{th}$ generation also referred to as 2G, 3G and 4G. PCRF is defined as part of LTE standard. Older communications networks do not provide basic capabilities to support bearers.

When bearers are not supported in the mobile network, a mediation mechanism may be required on the mobile terminal 120 that keeps track of the mapping of mobile application feature sets to the current congestion levels in the communications network 100. Therefore, this functionality and/or unit for this functionality such as a deciding unit 600 which also may be referred to as a mobile app broker, is introduced in the mobile terminal 120. Its functionality is to intervene with the mobile terminal applications and the communications network 100, and act as a guard stopping low-priority requests from the mobile applications of the mobile terminal 120.

Figure 7:
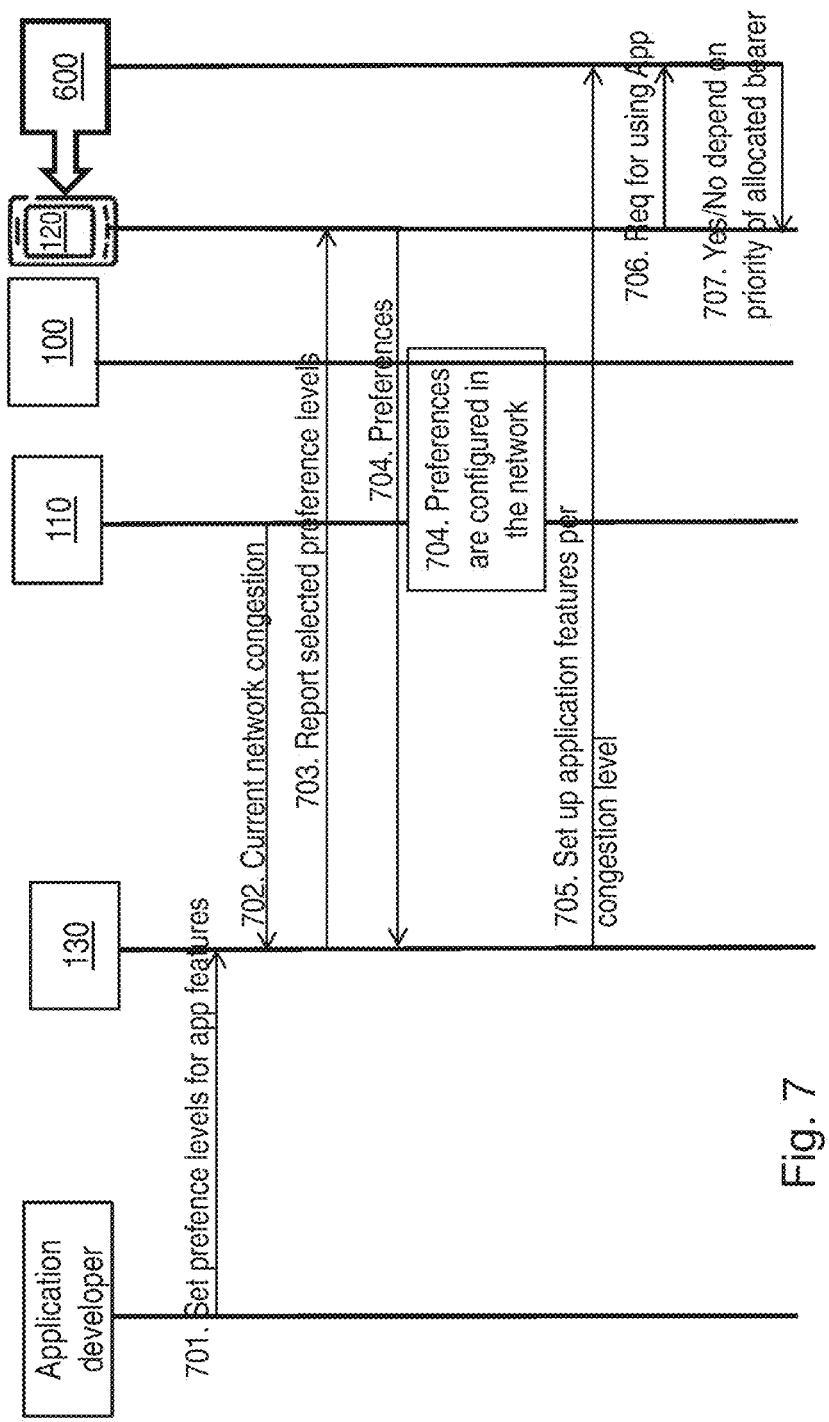
FIG. 7 is a sequence diagram depicting embodiments of a method in a communications network.

FIG. 7 is a sequence diagram that illustrates mapping of mobile application features to priority levels when network bearers are not supported.

Action 701.

As in the previous case, an application developer establishes different priority levels for features within the application. This means that the application developer may register the set of features within the application mapped per priority level. This mapping is then sent to and stored in the associating unit 130 such as the mapping server.

Action 702.

The mobile network such as the network node 110 in the communications network 100 reports the current congestion level to the associating unit 130 such as the mapping server, that consequently in Action 603 sends a request to the mobile terminal 120 for its preferences.

Action 703.

When the mobile terminal 120 responds with the selected preferences on the priorities of the applications and features within the applications, these are communicated back to the associating unit 130 such as the mapping server, and may be stored on it.

Action 704.

The associating unit 130 such as the mapping server configures priorities for application features for the current congestion level according to the selected preferences.

Action 705.

The associating unit 130 such as the mapping server then notifies the mobile terminal 120, e.g. the deciding unit 600 such as the Mobile App Broker in the mobile terminal 120, about the configuration of priorities for application features for the current congestion level.

After that, every time the mobile application makes a request Action 606 that is of lower priority than allowed for the current congestion level, the request is being dropped Action 707 by the Mobile App Broker, otherwise it is allowed.

Note that in the sequence diagrams shown in FIG. 5 and FIG. 6, the requests are initiated by the mobile terminal 120. However, the request may also be initiated by the mobile network e.g. the communications network 100 such as by a network node therein which may be an application server in the network Over-The-Top (OTT). An OTT application is any application or service that provides a product over the Internet and bypasses traditional distribution. Services that come over the top are typically related to media and communication. The requests initiated by the mobile network towards the mobile application are treated in a similar fashion. In the first embodiments when network bearers are supported, the associating unit 130 such as the mapping server receives the request from the network side of the application, and, if this request has lower priority then currently allowed, it will be dropped by the associating unit 130 such as the mapping server. In the second embodiments, when bearers are not supported, it's the mobile terminal 120 e.g. the deciding unit 600 such as the Mobile App Broker that takes the decision of dropping or passing through the request initiated by the network side of the application.

Figure 8:
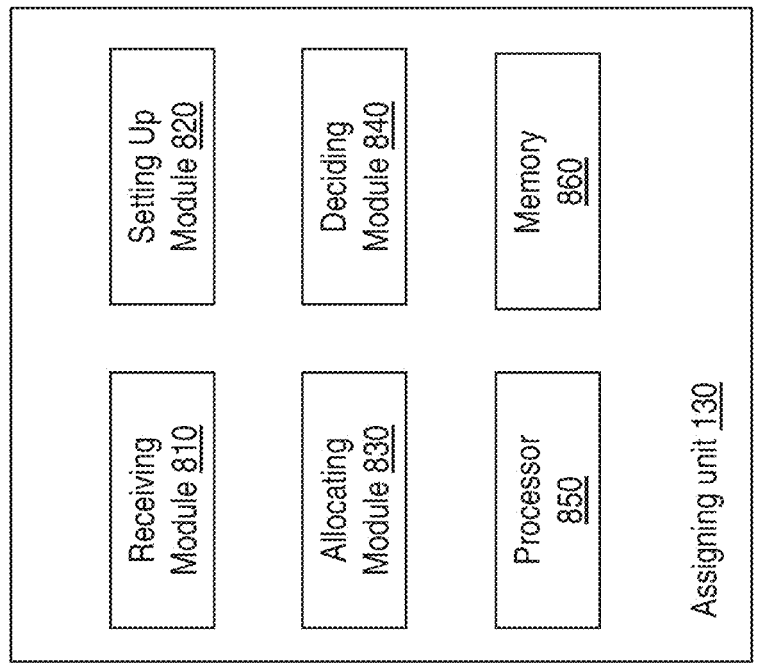
FIG. 8 is a schematic block diagram illustrating embodiments of an associating unit.

To perform the method actions for setting up bearers in a communications network 100 being congested, the associating unit 130 may comprise the following arrangement depicted in FIG. 8. As mentioned above, the associating unit 130 is operable to serve a mobile terminal 120. The mobile terminal 120 is adapted to comprise an application related to communication over the communications network 100. The associating unit 130, the network node 110 and the mobile terminal 120 are operable in the communications network 100. The associating unit 130 may e.g. be comprised in a network node operating in the communications network 100 or in the mobile terminal 120.

The associating unit 130 is configured to, e.g. by means of a receiving module 810 configured to, receive from the network node 110, information about a current congestion level of the communications network 100.

The associating unit 130 is further configured to, e.g. by means of the receiving module 810 configured to, receive from the mobile terminal 120, a selected preference level for the application.

The associating unit 130 is further configured to, e.g. by means of a setting up module 820 configured to, when the communications network 100 is congested, set up in the communications network 100, a set of bearers with different levels of priority, based on the current congestion level of the communications network 100, by associating a bearer with its priority level, out of the set of bearers, with the application based on the selected preference level of the application. The bearer in the set of bearers is set up for the application in mobile terminal 120 for communication over the communications network 100.

In some embodiments, the application is adapted to comprise multiple features.

In these embodiments, the associating unit 130 is further configured to e.g. by means of the receiving module 810 configured to, receive from the mobile terminal 120, a selected preference level for the application by, receiving from the mobile terminal 120, a selected preference level for each respective application feature of the multiple features in the application.

In these embodiments, the associating unit 130 is further configured to, e.g. by means of the setting up module 820 configured to, associate a bearer with its priority level, out of the set of bearers, with the application based on the selected preference level of the application by associating each bearer in the set of bearers with its respective priority level to one or more of the respective application features based on its respective selected preference level.

In these embodiments, the bearer in the set of bearers is set up for the application in mobile terminal 120 to communicate over the communications network 100 comprises the bearers in the set of bearers are set up for the multiple features of the application in the mobile terminal 120 for communication over the communications network 100.

In some embodiments, the mobile terminal 120 is adapted to comprise multiple applications.

In these embodiments, the associating unit 130 is further configured to e.g. by means of the receiving module 810 configured to, receive from the mobile terminal 120, a selected preference level for the application by receiving from the mobile terminal 120, a selected preference level for each respective application of the multiple applications.

In these embodiments, the associating unit 130 is further configured to, e.g. by means of the setting up module 820 configured to, associating the bearer with its priority level, out of the set of bearers, with the application based on the selected preference level of the application by associating each bearer in the set of bearers with its respective priority level to one or more of the respective applications of the multiple applications based the selected preference level of respective application of the multiple applications.

In these embodiments, the bearer in the set of bearers is set up for the application in mobile terminal 120 to communicate over the communications network 100 comprises the bearers in the set of bearers are set up for the multiple applications in the mobile terminal 120 for communication over the communications network 100.

In some embodiments, the associating unit 130 is further configured to, e.g. by means of an allocating module 830 configured to, allocate to the mobile terminal 120 a bearer out of the set of bearers for a communication, based on the current congestion level of the communications network 100.

In these embodiments, the associating unit 130 may further be configured to, e.g. by means of a deciding module 840 configured to, decide to allow a communication on the allocated bearer with one or more out of: the application when the application is associated to the allocated bearer, a specific feature out of the multiple features of the application when the specific feature is associated to the allocated bearer, and a specific application out of the multiple applications when specific application is associated to the allocated bearer.

In these embodiments, the associating unit 130 may further be configured to, e.g. by means of the deciding module 840 configured to, decide to discard a communication on the allocated bearer with one or more out of: the application when the application is not associated to the allocated bearer, a specific feature out of the multiple features of the application when the specific feature is not associated to the allocated bearer, and a specific application out of the multiple applications when specific application is not associated to the allocated bearer.

In some embodiments, the associating unit 130 is further configured to e.g. by means of the receiving module 810 configured to, receive from the mobile terminal 120 or a network node operating in the communications network 100, a request for communication with one or more out of: the application, the specific feature out of the multiple features of the application, and the specific application out of the multiple applications.

The embodiments herein may be implemented through one or more processors, such as a processor 850 in the associating unit 130 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the associating unit 130. One such carrier may be in the form of a CD ROM disc. It is however feasible with other data carriers such as a memory stick. The computer program code may furthermore be provided as pure program code on a server and downloaded to the associating unit 130.

The associating unit 130 may further comprise a memory 860 comprising one or more memory units. The memory 860 comprises instructions executable by the processor 850.

The memory 860 is arranged to be used to store e.g. information relating to applications and its features, selected preference level for applications, information about a current congestion level of the communications network 100, bearers set up for the application, data, and configurations, to perform the methods herein when being executed in the associating unit 130.

In some embodiments, a computer program comprises instructions, which when executed by the at least one processor 850, cause the at least one processor 850 to perform actions according to any of the Actions 301-307.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the associating unit 130, described above may refer to a combination of analog and digital circuits, and/or one or more processors 850 configured with software and/or firmware, e.g. stored in the memory 860, that when executed by the one or more processors such as the processor 850 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 9:
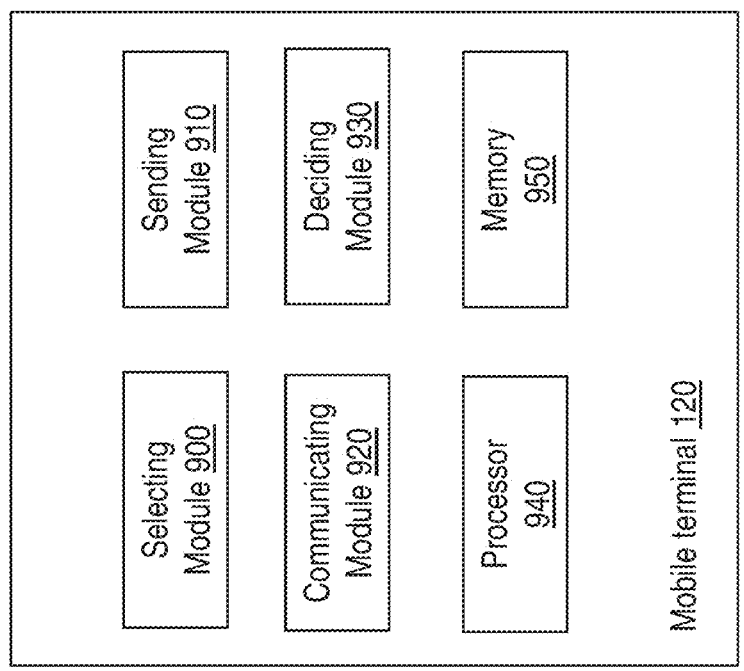
FIG. 9 is a schematic block diagram illustrating embodiments of a mobile terminal.

To perform the method actions for communicating in a communications network 100 being congested, the mobile terminal 120 may comprise the following arrangement depicted in FIG. 9. As mentioned above, the mobile terminal 120 is operable to be served by an associating unit 130. The mobile terminal 120 is adapted to comprise an application related to communication over the communications network 100. The associating unit 130 and the mobile terminal 120 are operable in the communications network 100. The associating unit 130 may in some embodiments e.g. be comprised in the mobile terminal 120.

The mobile terminal 120 is configured to, e.g. by means of a selecting module 900 configured to, select a preference level for the application.

The mobile terminal 120 is configured to, e.g. by means of a sending module 910 configured to, send to the associating unit 130, a selected preference level for the application. A set of bearers with different levels of priority of the bearers is set up in the communications network 100, when the communications network 100 is congested, based on a current congestion level of the communications network 100. A bearer with its priority level out of the set of bearers, is associated to the application based on the selected preference level of the application. The bearer in the set of bearers is set up for the application in the mobile terminal 120 for communication over the communications network 100.

The mobile terminal 120 may further be configured to, e.g. by means of a communicating module 920 configured to, communicate with the application on an allocated bearer out of the set of bearers, when the application is associated to the allocated bearer.

In some embodiments the application comprises multiple features, wherein the selected preference level for the application comprises a selected preference level for each respective application feature of the multiple features in the application.

In these embodiments, the mobile terminal 120 is configured to, e.g. by means of the sending module 910 further configured to, send to the associating unit 130, a selected preference level for the application sending to the associating unit 130, a selected preference level for each respective application feature of the multiple features in the application.

In these embodiments, the bearer with its priority level out of the set of bearers, is associated to the application based on the selected preference level of the application, comprises: each bearer with its respective priority level out of the set of bearers is associated to one or more of the respective application features based on its respective selected preference level.

In these embodiments, the bearer in the set of bearers is set up for the application in the mobile terminal 120 for communication over the communications network 100 comprises: the bearers in the set of bearers are set up for the multiple features of the application in the mobile terminal 120 for communication over the communications network 100.

In these embodiments, mobile terminal 120 may further be configured to, e.g. by means of a communicating module 920 configured to, communicate with the application on an allocated bearer out of the set of bearers, when the application is associated to the allocated bearer by communicating with a specific feature out of the multiple features of the application, when the specific feature is associated to the allocated bearer.

In some embodiments the mobile terminal 120 is adapted to comprise multiple applications, wherein the selected preference level for the application comprises a selected preference level for each respective application of the multiple applications.

In these embodiments, the mobile terminal 120 is further configured to, e.g. by means of the sending module 910 further configured to, send to the associating unit 130, a selected preference level for the application by sending to the associating unit 130, a selected preference level for each respective application of the multiple applications.

In these embodiments, bearer with its priority level out of the set of bearers, is associated to the application based on the selected preference level of the application, comprises: each bearer with its respective priority level out of the set of bearers is associated to one or more of the respective applications of the multiple applications based the selected preference level of respective application of the multiple applications.

In these embodiments, the bearer in the set of bearers is set up for the application in the mobile terminal 120 for communication over the communications network 100 comprises: the bearers in the set of bearers are set up for the multiple applications in the mobile terminal 120 for communication over the communications network 100, and In these embodiments, mobile terminal 120 may further be configured to, e.g. by means of a communicating module 920 configured to, communicate with the application on an allocated bearer out of the set of bearers, when the application is associated to the allocated bearer by communicating with a specific application out of the multiple applications in the mobile terminal 120, when the specific application is associated to the allocated bearer.

In some embodiments the mobile terminal 120 further is configured to, e.g. by means of the sending module 910 further configured to, send to the associating unit 130, a request for communication with one or more out of: the application, the specific feature out of the multiple features of the application, and the specific application out of the multiple applications.

In some embodiments the mobile terminal 120 further is configured to, e.g. by means of a deciding module 930 further configured to, decide to allow a communication on an allocated bearer with one or more out of: the application when the application is associated to the allocated bearer, a specific feature out of the multiple features of the application when the specific feature is associated to the allocated bearer, and a specific application out of the multiple applications when specific application is associated to the allocated bearer.

In some embodiments the mobile terminal 120 may further be configured to, e.g. by means of the deciding module 930 further configured to, decide to discard a communication on an allocated bearer with one or more out of: the application when the application is not associated to the allocated bearer, a specific feature out of the multiple features of the application when the specific feature is not associated to the allocated bearer, and a specific application out of the multiple applications when specific application is not associated to the allocated bearer.

The embodiments herein may be implemented through one or more processors, such as a processor 940 in the mobile terminal 120 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the mobile terminal 120. One such carrier may be in the form of a CD ROM disc. It is however feasible with other data carriers such as a memory stick. The computer program code may furthermore be provided as pure program code on a server and downloaded to the mobile terminal 120.

The mobile terminal 120 may further comprise a memory 950 comprising one or more memory units. The memory 950 comprises instructions executable by the processor 940.

The memory 950 is arranged to be used to store e.g. information relating to applications and its features, selected preference level for applications, information about a current congestion level of the communications network 100, bearers set up for the application, data, and configurations, to perform the methods herein when being executed in the mobile terminal 120.

In some embodiments, a computer program comprises instructions, which when executed by the at least one processor 940, cause the at least one processor 940 to perform actions according to any of the Actions 401-406.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the mobile terminal 120 described above may refer to a combination of analog and digital circuits, and/or one or more processors 940 configured with software and/or firmware, e.g. stored in the memory 950, that when executed by the one or more processors such as the processor 940 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, performed by an associating unit, for setting up bearers in a communications network, the communications network being congested, the associating unit serving a mobile terminal, the mobile terminal comprising an application related to communication over the communications network, wherein the associating unit, a network node, and the mobile terminal operate in the communications network, the method comprising:
receiving, from the network node, information about a current congestion level of the communications network;
receiving, from the mobile terminal, a selected preference level for the application;
when the communications network is congested, setting up, in the communications network, a set of bearers with different levels of priority based on a current congestion level of the communications network by associating a bearer out of the set of bearers with the application based on the selected preference level of the application, the bearer in the set of bearers being set up for the application in mobile terminal for communication over the communications network.

2. The method of claim 1:
wherein the application comprises multiple features;
wherein the receiving the selected preference level for the application comprises receiving, from the mobile terminal, a selected preference level for each respective application feature of the multiple features in the application;
wherein the associating the bearer with its priority level comprises associating each bearer in the set of bearers to one or more of the respective application features based on the feature's respective selected preference level; and
wherein the bearers in the set of bearers are set up for the multiple features of the application in the mobile terminal for communication over the communications network.

3. The method of claim 1:
wherein the mobile terminal comprises multiple applications;
wherein the receiving the selected preference level for the application comprises receiving, from the mobile terminal, a selected preference level for each respective application of the multiple applications;
wherein the associating the bearer with the application based on the selected preference level of the application comprises associating each bearer in the set of bearers to one or more of the respective applications of the multiple applications based the selected preference level of respective application of the multiple applications; and
wherein the bearers in the set of bearers are set up for the multiple applications in the mobile terminal for communication over the communications network.

4. The method of claim 1, further comprising:
allocating, to the mobile terminal, a bearer out of the set of bearers for a communication based on the current congestion level of the communications network;
deciding to allow a communication on the allocated bearer with one or more out of:
the application when the application is associated to the allocated bearer;
a specific feature out of multiple features of the application when the specific feature is associated to the allocated bearer; and
a specific application out of multiple applications when specific application is associated to the allocated bearer; and
deciding to discard a communication on the allocated bearer with one or more out of:
the application when the application is not associated to the allocated bearer;
a specific feature out of multiple features of the application when the specific feature is not associated to the allocated bearer; and
a specific application out of the multiple applications when specific application is not associated to the allocated bearer;
receiving, from the mobile terminal or a network node operating in the communications network, a request for communication with one or more out of: the application, the specific feature, and the specific application;
wherein the bearers in the set of bearers have different levels of priority which are taken into consideration when associating the bearer with the application, the specific feature, and the specific application.

5. The method of claim 1, wherein the associating unit is comprised in a network node operating in the communications network or comprised in the mobile terminal.

6. A method, performed by a mobile terminal, for communicating in a communications network, the communications network being congested, the mobile terminal being served by an associating unit, the mobile terminal comprising an application related to communication over the communications network, wherein the associating unit and the mobile terminal operate in the communications network, the method comprising;

selecting a preference level for the application;

sending, to the associating unit, the selected preference level for the application;

wherein, when the communications network is congested, a set of bearers with different levels of priority is set up in the communications network based on a current congestion level of the communications network; and wherein a bearer out of the set of bearers, with its respective priority level, is associated to the application based on the selected preference level of the application, the bearer being set up for the application in the mobile terminal for communication over the communications network.

7. The method of claim 6, further comprising:

communicating with the application, on an allocated bearer out of the set of bearers, when the application is associated to the allocated bearer;

deciding to allow a communication on the allocated bearer with one or more out of:
  the application when the application is associated to the allocated bearer;
  a specific feature out of multiple features of the application when the specific feature is associated to the allocated bearer; and
  a specific application out of multiple applications when specific application is associated to the allocated bearer; and deciding to discard a communication on the allocated bearer with one or more out of:
  the application when the application is not associated to the allocated bearer;
  a specific feature out of the multiple features of the application when the specific feature is not associated to the allocated bearer; and
  a specific application out of the multiple applications when specific application is not associated to the allocated bearer;

wherein the bearers in the set of bearers have different levels of priority which are taken into consideration when associating the bearer with the application, the specific feature, and the specific application;

wherein the associating unit is comprised in the mobile terminal.

8. The method of claim 7:

wherein the application comprises multiple features;

wherein the selected preference level for the application comprises a selected preference level for each respective application feature of the multiple features in the application;

wherein each bearer, with its respective priority level out of the set of bearers, is associated to one or more of the respective application features based on the respective feature's selected preference level;

wherein the bearers in the set of bearers are set up for the multiple features of the application in the mobile terminal for communication over the communications network; and wherein the communicating with the application on an allocated bearer out of the set of bearers, when the application is associated to the allocated bearer, comprises communicating with a specific feature out of the multiple features of the application, when the specific feature is associated to the allocated bearer.

9. The method of claim 7:

wherein the mobile terminal comprises multiple applications;

wherein the selected preference level for the application comprises a selected preference level for each respective application of the multiple applications;

wherein each bearer, with its respective priority level out of the set of bearers, is associated to one or more of the respective applications of the multiple applications based the selected preference level of the respective application of the multiple applications;

wherein the bearer in the set of bearers is set up for the application in the mobile terminal for communication over the communications network comprises: the bearers in the set of bearers are set up for the multiple applications in the mobile terminal for communication over the communications network; and wherein communicating with the application on an allocated bearer out of the set of bearers, when the application is associated to the allocated bearer, comprises communicating with a specific application out of the multiple applications in the mobile terminal, when the specific application is associated to the allocated bearer;

wherein the method further comprises sending to the associating unit or a deciding unit in the mobile terminal, a request for communication with one or more out of: the application, a specific feature out of multiple features of the application, and a specific application out of multiple applications.

10. An associating unit for setting up bearers in a communications network that is congested, the associating unit being operable to serve a mobile terminal, the mobile terminal comprising an application related to communication over the communications network, wherein the associating unit, a network node, and the mobile terminal are operable in the communications network, the associating unit comprising:

processing circuitry;

memory containing instructions executable by the processing circuitry whereby the associating unit is operative to:
  receive, from the network node, information about a current congestion level of the communications network;
  receive, from the mobile terminal, a selected preference level for the application;
  when the communications network is congested, set up, in the communications network, a set of bearers with different levels of priority based on the current congestion level of the communications network by associating a bearer out of the set of bearers with the application based on the selected preference level of the application, the bearer being set up for the application in mobile terminal for communication over the communications network.

11. The associating unit of claim 10:

wherein the application is adapted to comprise multiple features;

wherein the instructions are such that the associating unit is operative to:
  receive, from the mobile terminal, a selected preference level for each respective application feature of the multiple features in the application;

associate each bearer in the set of bearers, with its respective priority level, to one or more of the respective application features based on its respective selected preference level; and set up the bearers in the set of bearers for the multiple features of the application in the mobile terminal for communication over the communications network.

12. The associating unit of claim 10:

wherein the mobile terminal is adapted to comprise multiple applications;

wherein the instructions are such that the associating unit is operative to:

receive, from the mobile terminal, a selected preference level for each respective application of the multiple applications;

associate each bearer in the set of bearers, with its respective priority level, to one or more of the respective applications of the multiple applications based the selected preference level of respective application of the multiple applications; and set up the set of bearers for the multiple applications in the mobile terminal for communication over the communications network.

13. The associating unit of claim 10, wherein the instructions are such that the associating unit is operative to:

allocate, to the mobile terminal, a bearer out of the set of bearers for a communication based on the current congestion level of the communications network;

decide to allow a communication on the allocated bearer with one or more out of:

the application when the application is associated to the allocated bearer;

a specific feature out of multiple features of the application when the specific feature is associated to the allocated bearer; and a specific application out of multiple applications when specific application is associated to the allocated bearer; and decide to discard a communication on the allocated bearer with one or more out of:

the application when the application is not associated to the allocated bearer;

a specific feature out of multiple features of the application when the specific feature is not associated to the allocated bearer; and a specific application out of multiple applications when specific application is not associated to the allocated bearer;

receive, from the mobile terminal or a network node operating in the communications network, a request for communication with one or more out of: the application, the specific feature, and the specific application;

wherein the bearers in the set of bearers have different levels of priority which are taken into consideration when associating the bearer with the application, the specific feature, and the specific application.

14. The associating unit of claim 10, wherein the associating unit is comprised in a network node operating in the communications network or comprised in the mobile terminal.

15. A mobile terminal for communicating in a communications network that is congested, the mobile terminal operable to be served by an associating unit, wherein the associating unit and the mobile terminal are operable in the communications network, the mobile terminal comprising:

processing circuitry;

an application related to communication over the communications network;

memory containing instructions executable by the processing circuitry whereby the associating unit is operative to:

receive, from the network node, information about a current congestion level of the communications network;

select a preference level for the application;

send, to the associating unit, the selected preference level for the application;

wherein a set of bearers with different levels of priority of the bearers is set up in the communications network, when the communications network is congested, based on a current congestion level of the communications network; and wherein a bearer out of the set of bearers is associated to the application based on the selected preference level of the application, the bearer in the set of bearers being set up for the application in the mobile terminal for communication over the communications network.

16. The mobile terminal of claim 15, wherein the instructions are such that the mobile terminal is operative to communicate with the application, on an allocated bearer out of the set of bearers, when the application is associated to the allocated bearer.

17. The mobile terminal of claim 16:

wherein the application comprises multiple features;

wherein selected preference level for the application is represented by a selected preference level for each respective application feature of the multiple features in the application;

wherein the each bearer out of the set of bearers is associated to one or more of the respective application features based on the respective application's selected preference level; and wherein the bearers in the set of bearers are set up for the multiple features of the application in the mobile terminal for communication over the communications network; and wherein the instructions are such that the mobile terminal is operative to communicate with the application on an allocated bearer out of the set of bearers, when the application is associated to the allocated bearer, by communicating with a specific feature out of the multiple features of the application, when the specific feature is associated to the allocated bearer.

18. The mobile terminal of claim 16:

wherein the mobile terminal is adapted to comprise multiple applications;

wherein the selected preference level for the application is represented by a selected preference level for each respective application of the multiple applications;

wherein each bearer out of the set of bearers is associated to one or more of the respective applications of the multiple applications based the selected preference level of respective application of the multiple applications; and wherein the bearers in the set of bearers are set up for the multiple applications in the mobile terminal for communication over the communications network, and wherein the instructions are such that the mobile terminal is operative to communicate with the application on an allocated bearer out of the set of bearers, when the application is associated to the allocated bearer, by communicating with a specific application out of the multiple applications in the mobile terminal, when the specific application is associated to the allocated bearer.

19. The mobile terminal of claim 15:
wherein the instructions are such that the mobile terminal is operative to send, to the associating unit or a deciding unit in the mobile terminal, a request for communication with one or more out of: the application, a specific feature out of multiple features of the application, and a specific application out of multiple applications;
wherein the bearers in the set of bearers have different levels of priority which are taken into consideration when associating the bearer with the application; and
wherein the associating unit is comprised in the mobile terminal.

20. The mobile terminal of claim 15, wherein the instructions are such that the mobile terminal is operative to:
decide to allow a communication on an allocated bearer with one or more out of:
   the application when the application is associated to the allocated bearer;
   a specific feature out of multiple features of the application when the specific feature is associated to the allocated bearer; and
   a specific application out of multiple applications when specific application is associated to the allocated bearer; and
decide to discard a communication on an allocated bearer with one or more out of:
   the application when the application is not associated to the allocated bearer;
   a specific feature out of multiple features of the application when the specific feature is not associated to the allocated bearer; and
   a specific application out of multiple applications when specific application is not associated to the allocated bearer.

* * * * *